United States Patent Office 3,609,874
Patented Oct. 5, 1971

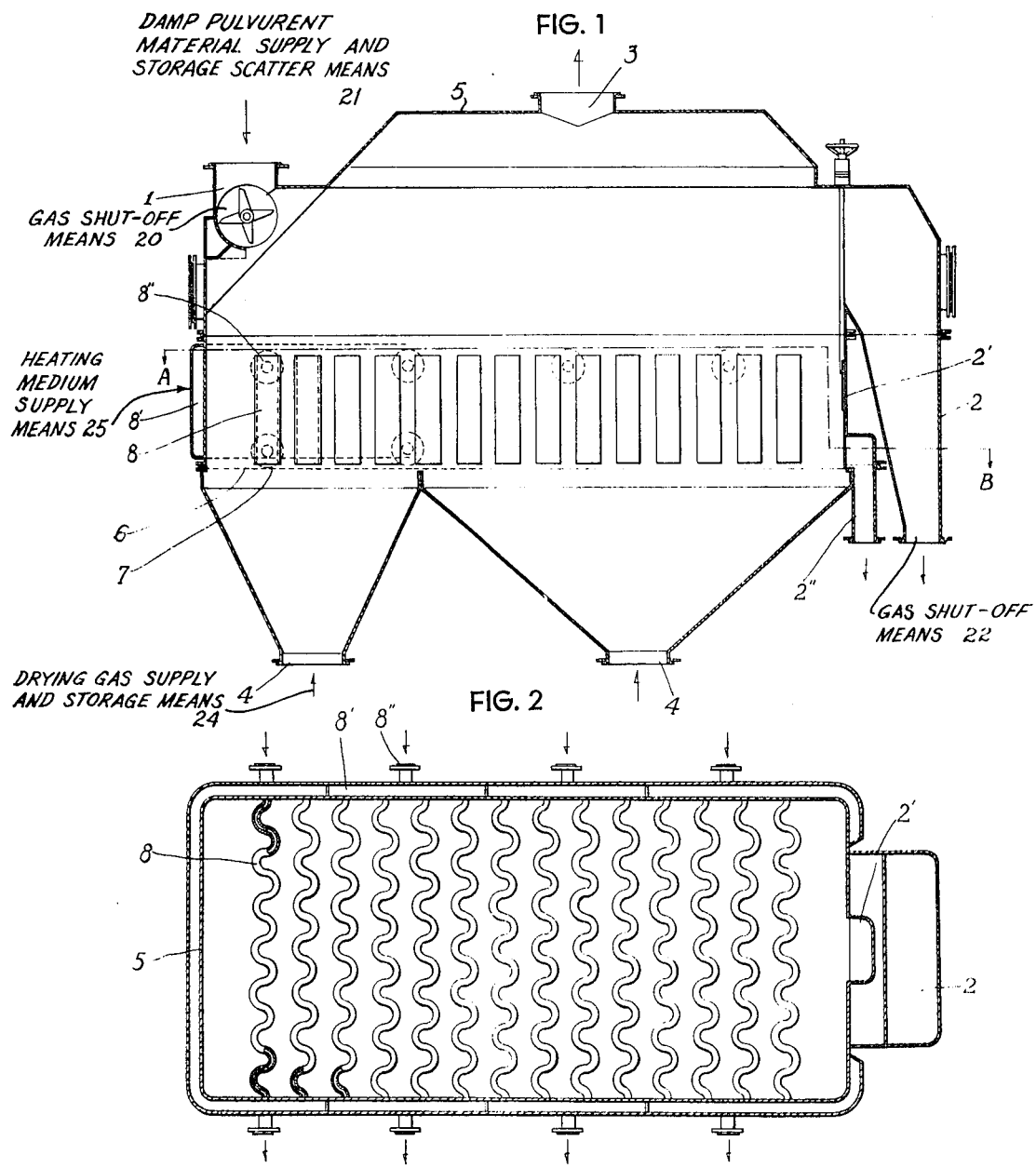

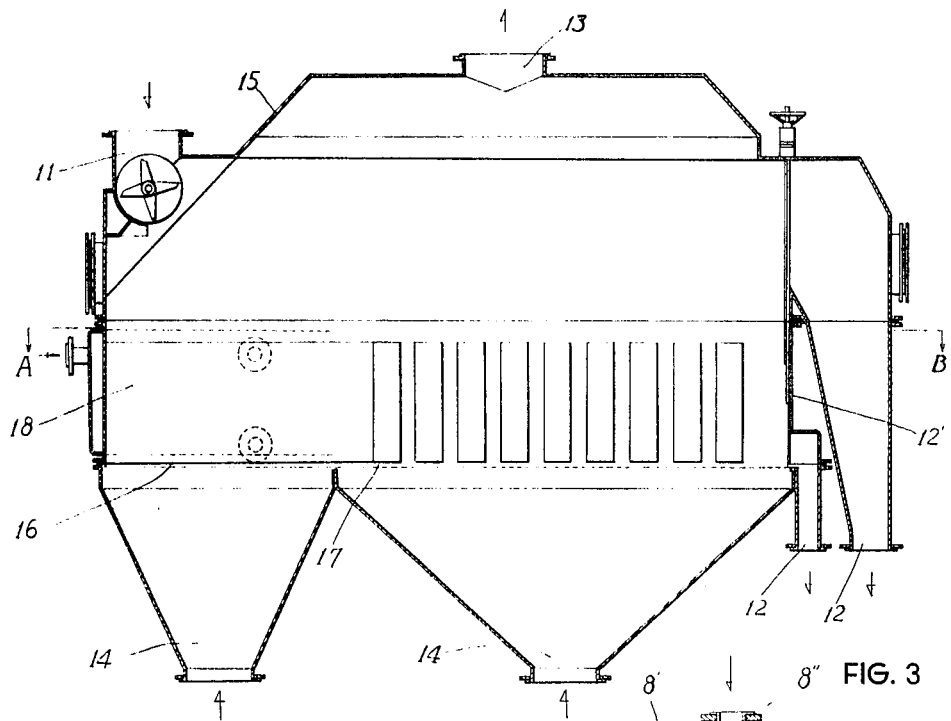
FIG. 4
FIG. 3
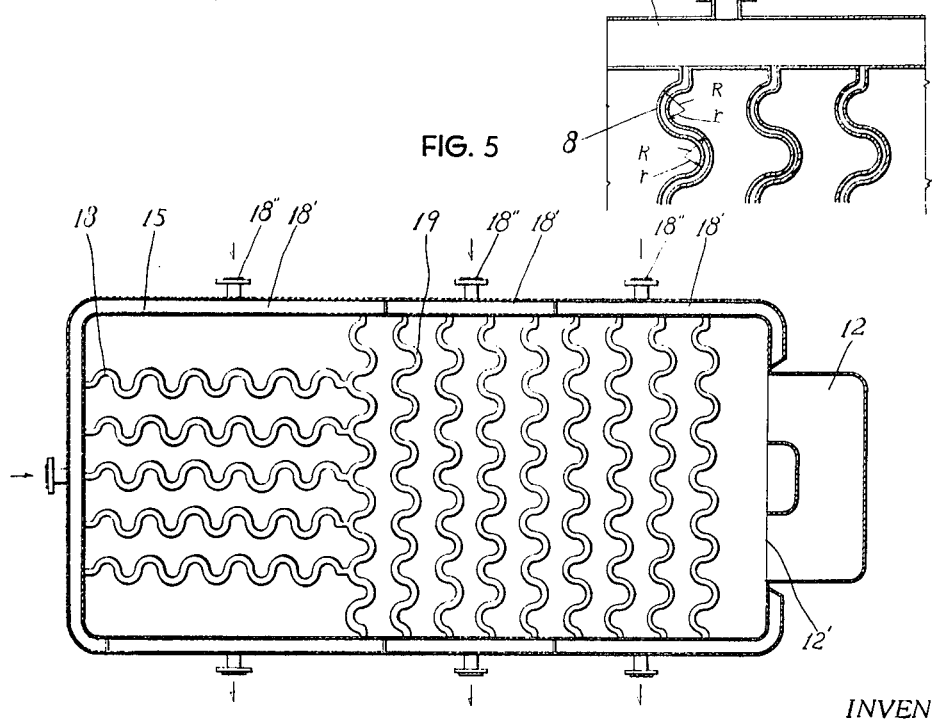
FIG. 5
INVENTOR.
JIYUICHI NARA
ATTORNEY

3,609,874
APPARATUS FOR FLUIDIZING AND DRYING
PULVERANT MATERIALS
Jiyuichi Nara, 2-7-8 Higashi-ooi, Shinagawa-ku,
Tokyo, Japan
Filed Apr. 15, 1969, Ser. No. 816,335
Claims priority, application Japan, Apr. 17, 1968,
43/25,742; May 21, 1968, 43/34,221
Int. Cl. F26b 17/16
U.S. Cl. 34—57 A                    5 Claims

ABSTRACT OF THE DISCLOSURE

The disclosure is comprised to carry out heating and drying of pulverant materials efficiently and also smoothen the flow of the powders thus dried, by installing heat exchanging means in a layer of a pulverant material fluidized by gas on a perforated plate in such a manner that a multiplicity of heat exchanging plates, hollow and corrugated in transverse section, are arranged vertically in a longitudinal row and the pulverant material is fluidized among the hollow, transversely-corrugated heat exchanging plates without giving rise to any dead-angle space in which the fluidized powder may be kept from the contact with the gas by the configurations of the heat exchanging plates.

BACKGROUND OF THE INVENTION

A prior art apparatus designed for continuous fluidizing and drying of pulverant materials equipped with heat exchanging pipes in the fluid layer is disclosed in the periodical "Chemical Engineering Process" July 1956, pp. 274–280. It is to be noted in this connection that the configuration of heat exchanging means installed in the flow passage for the fluid layer of moving powder particles bring a fairly wide range of differences in the proportion of the effectively utilizable area of the surface of the heat exchanging means and that the arrangement of the heat exchanging means dictates the frequency and uniformity with which the powder of the fluid layer contacts the heat exchanger surface, which in turn can have of course a material effect upon the overall efficiency of heat exchange.

SUMMARY OF THE INVENTION

This invention relates to a novel apparatus for fluidizing and drying pulverant materials.

The present invention has been perfected after diversified researches on the subject with the forgoing in view. The invention has therefore as its object to carry out heating and drying of pulverant materials efficiently and also smoothen the flow of the powders thus dried, by installing heat exchanging means in a layer of a pulverant material fluidized by gas on a perforated plate in such a manner that a multiplicity of heat exchanging plates, hollow and corrugated in transverse section, are arranged vertically in a longitudinal row and the pulverant material is fluidized among the hollow, transversely-corrugated heat exchanging plates without giving rise to any dead-angle space in which the fluidized powder may be kept from the contact with the gas by the configurations of the heat exchanging plates.

The present invention, perfected to realize the foregoing object, provides an apparatus for fluidizing and drying pulverant materials comprising a dryer casing provided with an inlet at one end for charging a damp pulverant material which is equipped with gas shut-off means such as a rotary valve, an outlet at the other end for discharging dried material which is also equipped with gas shut-off means, an exhaust opening at the top for discharging humidified gas and inlet openings at the bottom for introducing a gas for drying purpose, a perforated plate for fluidizing the pulverant material which is laid horizontally in the lower part of the boiler, a plurality of heat exchanging plates, hollow and corrugated in transverse section with a height such that the upper portion of the fluidized powder layer can flow thereover, set up above perforated plate with a suitable space therebetween and in the direction to obstruct the sidewise movement of the fluidized powder layer, and means for introducing a heating medium for the exchange of heat with the powder in the fluidized layer from a source outside the dryer casing into the hollow spaces inside said heat exchanging plates.

Also, the present invention is directed to provide an apparatus for fluidizing and drying pulverant materials wherein heat exchanging means are provided in the layer of a pulverant material fluidized by a gas over a perforated plate, comprising a dryer casing provided with an inlet at one end for charging a damp pulverant material which is equipped with gas shut-off means such as a rotary valve, an outlet at the other end for discharging dried material which is also equipped with gas shut-off means, an exhaust opening at the top for discharging humidified gas and inlet openings at the bottom for introducing a gas for drying purpose such as hot air or hot nitrogen, a perforated plate for fluidizing the pulverant material which is laid horizontally in the lower part of the dryer, a plurality of heat exchanging plates, hollow and corrugated in transverse section with a height such that the upper portion of the fluidized powder layer can flow thereover, set up above the perforated plate with a suitable space therebetween and parallelly oriented to the direction in which the fludized powder layer advances in the area close to the inlet for damp pulverant material and also a plurality of heat exchanging plates of the same shape and height as above arranged in the direction where they obstruct the sidewise movement of the fluidized powder layer, and means for introducing a heating medium such as steam or hot water for the exchange of heat with the powder in the fluidized layer from a source outside the dryer casing into the hollow spaces inside said heat exchanging plates.

These and other objects, features and advantages of the present invention will become apparent from the following detailed description taken in conjunction with the accompanying drawings illustrating apparatus for fluidizing and drying pulverant materials in accordance with the present invention, designed for carrying out the fluidization among a multiplicity of hollow, transversely-corrugated heat exchanging plates.

BRIEF DESCRIPTION OF THE DRAWING

FIG. 1 is a side elevation view, in vertical section, of a form of apparatus according to the invention;

FIG. 2 is a sectional plan view taken along the line A–B of FIG. 1;

FIG. 3 is a plan view in transverse section of a part of hollow, transversely-corrugated heat exchanging plates and an inlet opening for the heating medium;

FIG. 4 is a side elevational view, in vertical section, of another form of apparatus for fluidizing and drying pulverant materials according to the invention;

FIG. 5 is a sectional plan view taken along the line A–B of FIG. 4.

DETAIL OF THE INVENTION

Referring first to FIGS. 1 to 3, an apparatus embodying the invention comprises a dryer casing 5 provided with an inlet 1 at an end for charging a damp pulverant material 21 which is equipped with gas shut-off means 20 such as a rotary valve, an outlet 2 is provided at the other end for discharging dried material which is also equipped with gas shut-off means 22, another outlet 2" is also provided at said other end, and exhaust opening 3 at the top for discharging humidified gas, and inlet openings 4 at the bottom for introducing a gas 24 for drying purpose such as hot air or hot inert gas, a perforated plate 6 for fluidizing the pulverant material which is laid horizontally in the lower part of the dryer, a plurality of heat exchanging plates 8, hollow and corrugated in transverse section with a height such that the upper portion of the fluidized powder layer can flow thereover, set up above the perforated plate with a suitable space therebetween and in the direction to obstruct the sidewise movement of the fluidized powder layer, and means 25 for introducing a heating medium such as steam or hot water for the exchange of heat with the powder in the fluidized layer from a source outside the dryer casing 5 into the hollow spaces inside said heat exchanging plates 8. In FIG. 1, reference numeral 2' indicates a weir plate installed at discharge end of the casing. The outlet 2 is for discharge of dried powder and is disposed above the weir plate and the outlet 2" is for discharge of agglomerated particles of powder and is disposed below the weir plate. A distribution chamber 8' is provided to distribute the medium for heat exchange among the hollow, transversely-corrugated heat exchanging plates 8, and the chamber is equipped with pipes for introducing the heat exchanging medium thereinto.

In explaining the performance of the apparatus for fluidizing and drying pulverant materials that carries out the fluidization among the plurality of hollow, transversely-corrugated heat exchanging plates in accordance with the present invention, the features of the heat exchanging means will be first described hereunder. As described, the heat exchanging means of the invention take the form of hollow, transversely corrugated plates as indicated at 8. Accordingly, the outer surface area of each plate is about 1.5 times as large as that of a hollow flat plate of the same height and same thickness. This means that the heat exchanging plate of the invention is far superior in performance to the conventional non-corrugated one. Also, a comparison of the outer surface area indicates that a heat exchanging plate of the invention is substantially comparable to a row of cylinders same in number with the ridges or furrows of the corrugation. Heretofore, where a pulverant material is to be fluidized and urged forward past cylindrical heat exchanging means, it has been inevitable that dead-angle non-contact boundaries are formed which correspond to dead spaces behind the cylinders against the flow of the pulverant material. On the other hand, the heat exchanging plates according to the invention are such that the pulverant material is fluidized in a fluid layer among the parallelly arranged row of upright, hollow and corrugated plates 8, 8. Thus, the heat exchanging plates 8 of the drying apparatus according to the invention provide no dead-angle non-contact boundaries as by the row of cylindrical pipes, that is, no dead spaces behind the cylinders against the movement of the pulverant material, and therefore the frequency of opportunities in which the pulverant material contacts with the heat exchanging means in accordance with the invention is sufficiently high to ensure uniform contact of all particles with said heat exchanging means.

Moreover, because the heat exchanging means are so designed and operated as to permit the upper layer portion of the fluidized layer of pulverant material to advance over the heat exchanging means, the drying operation by the apparatus of the invention is accomplished efficiently and uniformly.

The pulverant material dried by the apparatus overflows the weir plate 2 and is discharged to the outside without the aid of any air stream.

Since the present apparatus operates in the foregoing manner thanks to the aforesaid features in the configuration and arrangement of the heat exchanging plates, it can advantageously dry up damp pulverant materials efficiently, smoothly and uniformly.

Referring to FIGS. 4 and 5 of the appended drawings, there is shown another embodiment of the invention wherein heat exchanging means are provided in the layer of a pulverant material fluidized by a gas over a perforated plate, comprising a dryer casing 15 provided with an inlet 11 at one end for charging a damp pulverant material which is equipped with gas shut-off means such as a rotary valve, an outlet 12 at the other end for discharging dried material which is also equipped with gas shut-off means, an exhaust opening 13 at the top for discharging humidified gas and inlet openings 14 at the bottom for introducing a gas for drying purpose such as hot air or hot nitrogen, a perforated plate 16 for fluidizing the pulverant material which is laid horizontally in the lower part of the dryer 15, a plurality of heat exchanging plates 18, hollow and corrugated in transverse section with a height such that the upper portion of the fluidized powder layer can flow thereover, set up above the perforated plate 16 with a suitable space therebetween and parallelly oriented to the direction in which the fluidized powder layer advances in the area close to the inlet for damp pulverant material and also a plurality of heat exchanging plates 19 of the same shape and height as above arranged in the direction where they obstruct the sidewise movement of the fluidized powder layer, and means for introducing a heating medium such as steam or hot water for the exchange of heat with the powder in the fluidized layer from a source outside the dryer casing 15 into the hollow spaces inside said heat exchanging plates 18 and 19.

In FIG. 4, reference numeral 12' indicates a weir plate for discharging dried powder, and 12" and outlet for agglomerated mass of powder particles. A distribution chamber 18' is provided for distributing the heat exchanging medium among the hollow, transversely-corrugated heat exchanging plates 18 and 19, and pipes 18" are provided for introducing the heat exchanging medium into the distributing chamber.

In this apparatus with the construction as above described, the hollow, transversely-corrugated heat exchanging plates 18 arranged parallelly near the inlet 11 for supply of damp pulverant material and in the direction aligned to the direction where the fluidized powder layer advances, dry up the fluidized pulverant material while urging the latter to and fro in the longitudinal direction of the dryer 15.

Therefore, when a pulverant material with a relatively high degree of humidity is to be dried by this apparatus, the material is first dried to a considerable extent by the hollow, transversely-corrugated heat exchanging plates 18 disposed in alignment with the direction in which the fluidized powder layer advances in the manner described, and thereafter the material is dried up and finished by the hollow, transversely-corrugated heat exchanging plates 19 parallelly arranged at right angles to the advancing direction of the pulverant material.

The powder drying apparatus according to the invention thus is characterized by preliminary drying through a reciprocating motion of a pulverant material of a relatively high dampness and by subsequent drying which is carried out in the usual manner.

I claim:

1. An apparatus for fluidizing and drying pulverous materials comprising a dryer casing provided with an inlet disposed adjacent one end thereof; means for charging a damp pulverous material into said inlet; gas shut-off means in said inlet; at least one outlet for discharging dried material disposed adjacent the opposite end of said casing; said outlet equipped with gas shut-off means, an exhaust opening at the top for discharging humidified gas and at least one inlet opening at the bottom for introducing a gas for drying purposes; a perforated plate for fluidizing said pulverous material, said plate laid horizontally in the lower part of the dryer; a plurality of hollow heat exchange plates corrugated in transverse section having heights permitting the upper portion of the fluidized powder layer to flow thereover, said plates set up above the perforated plate spaced therefrom and in a direction to obstruct the sidewise movement of the fluidized powder layer, and means for introducing a heating medium into the hollow spaces inside said heat exchanging plates to cause the exchange of heat with the powder in the fluidized layer.

2. An apparatus for fluidizing and drying pulverous materials as claimed in claim 1, said heat exchange means provided in the layer of said pulverous material, as it is fluidized over said perforated plate by the said gas introduced for drying purposes; said gas shut-off means in said inlet being a rotary valve; said gas for drying purposes being hot nitrogen; at least some of said heat exchange plates being mounted above the perforated plate parallelly oriented to the direction in which the fluidized powder layer advances in the area adjacent said inlet for said damp pulverous material; said heating medium being introduced into the hollow spaces of said heat exchange plates from a source outside the dryer casing.

3. An apparatus for fluidizing and drying pulverous materials as claimed in claim 1, said inlet having a mechanical scatter for charging the damp pulverous material; said gas shut-off means being a rotary valve; said at least one outlet being two outlets for discharging the dried material, one of said two outlets being located beneath a weir plate and the other above said weir plate; each of said two outlets being also equipped with gas shut-off means; said heat exchange plates having a height and being mounted, suitably spaced from the perforated plate and at right angles to the direction of flow of the fluidized powder layer, so that the upper portion of the fluidized powder layer can flow above and below said heat exchange plates.

4. An apparatus for fluidizing and drying pulverous materials comprising a dryer casing having:
(a) an inlet with a mechanical scatter at the upper end thereof for charging the damp pulverous material disposed adjacent one end of said casing, and provided with gas shut-off means,
(b) a weir plate and two outlets for discharging the dried material disposed adjacent the opposite end of said casing, one of said two outlets being located beneath said weir plate and the other above said weir plate, each of said two outlets being also equipped with a gas shut-off means,
(c) an exhaust opening at the top for discharging humidified gas and inlet openings at the bottom for introducing a hot dry gas for drying purposes;
(d) a perforated plate for fluidizing the pulverous material laid horizontally in the lower part of the dryer above said inlet openings;
(e) a plurality of heat exchange plates, hollow and corrugated in transverse section with a height such that the upper portion of the fluidized powder layer can flow above and below said plurality of heat exchange plates set up suitably spaced from the perforated plate, and
(f) parallel to the direction of flow of the fluidized powder layer in the area close to the inlet for said damp pulverous material;
(g) a plurality of heat exchange plates of the same shape and height as above arranged at right angles to the direction of flow of the fluidized powder layer and
(h) means for introducing a heating medium from a source outside the dryer casing into the hollow spaces inside said heat exchange plates for the exchange of heat with the powder in the fluidized layer.

5. An apparatus for fluidizing and drying pulverous materials as claimed in claim 4, said heat exchange plates being parallel to the advancing driection of the fluidized layer only in the high humidity region of said material on the inlet side.

References Cited
UNITED STATES PATENTS

| | | | |
|---|---|---|---|
| 2,316,664 | 4/1943 | Brassert et al. | 263—21 A X |
| 2,520,637 | 8/1950 | Henwood | 263—21 A |
| 2,529,366 | 11/1950 | Bauer | 263—12 A |
| 2,629,938 | 3/1953 | Montgomery | 34—10 |
| 2,657,473 | 11/1953 | Montgomery et al. | 34—10 |
| 2,761,668 | 9/1956 | Sylvest | 263—21 A X |
| 3,391,913 | 7/1968 | Jones | 34—57 A X |

FREDERICK L. MATTESON, JR., Primary Examiner

R. A. DUA, Assistant Examiner

U.S. Cl. X.R.

165—175